Sept. 24, 1946.  B. D. ASHBAUGH  2,408,285
FEEDING DEVICE FOR INJECTION OR EXTRUSION MACHINES
Filed July 15, 1943  2 Sheets-Sheet 1
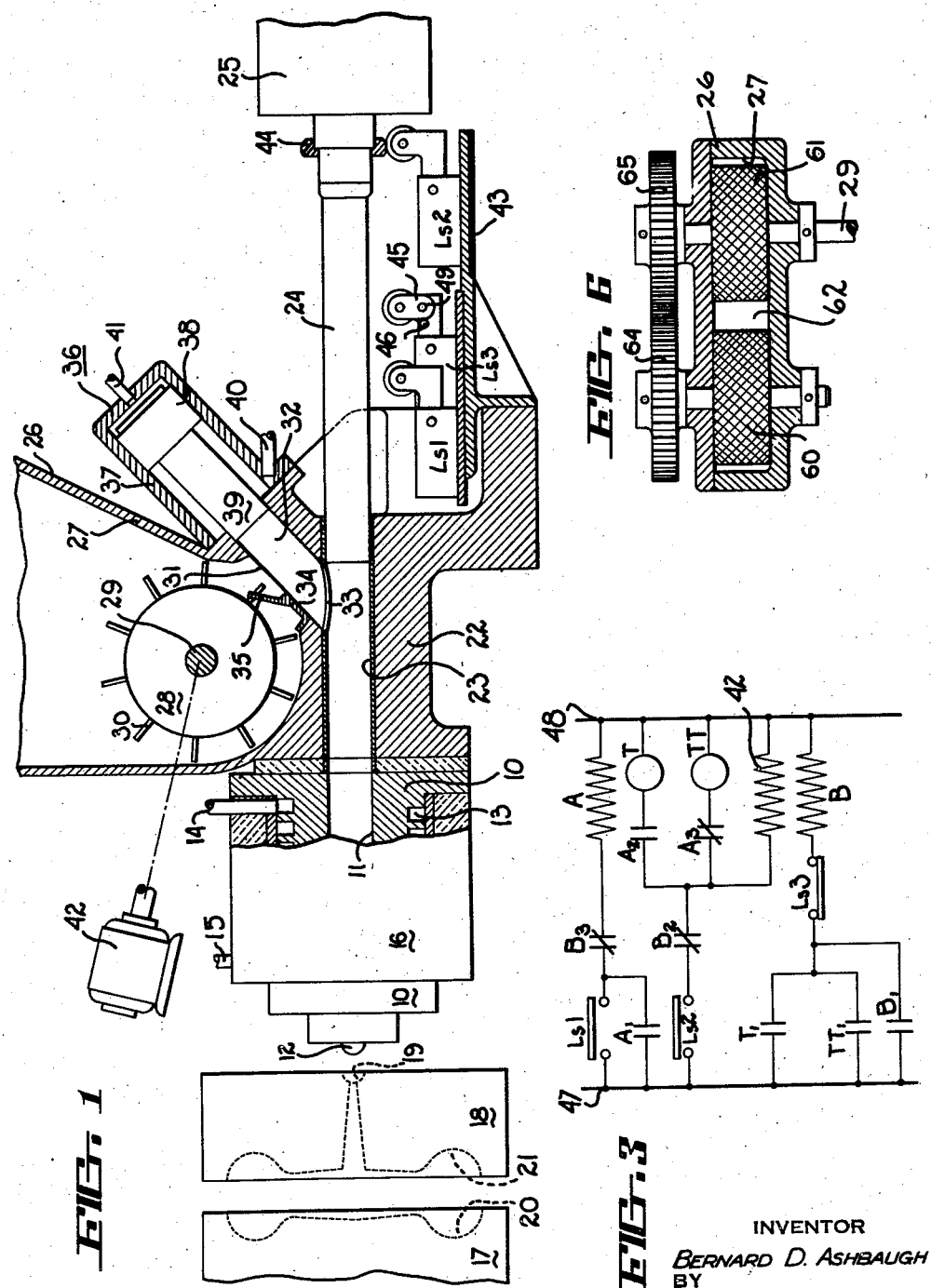
INVENTOR
BERNARD D. ASHBAUGH
BY
Toulmin & Toulmin
ATTORNEYS Sept. 24, 1946. B. D. ASHBAUGH 2,408,285
FEEDING DEVICE FOR INJECTION OR EXTRUSION MACHINES
Filed July 15, 1943 2 Sheets-Sheet 2
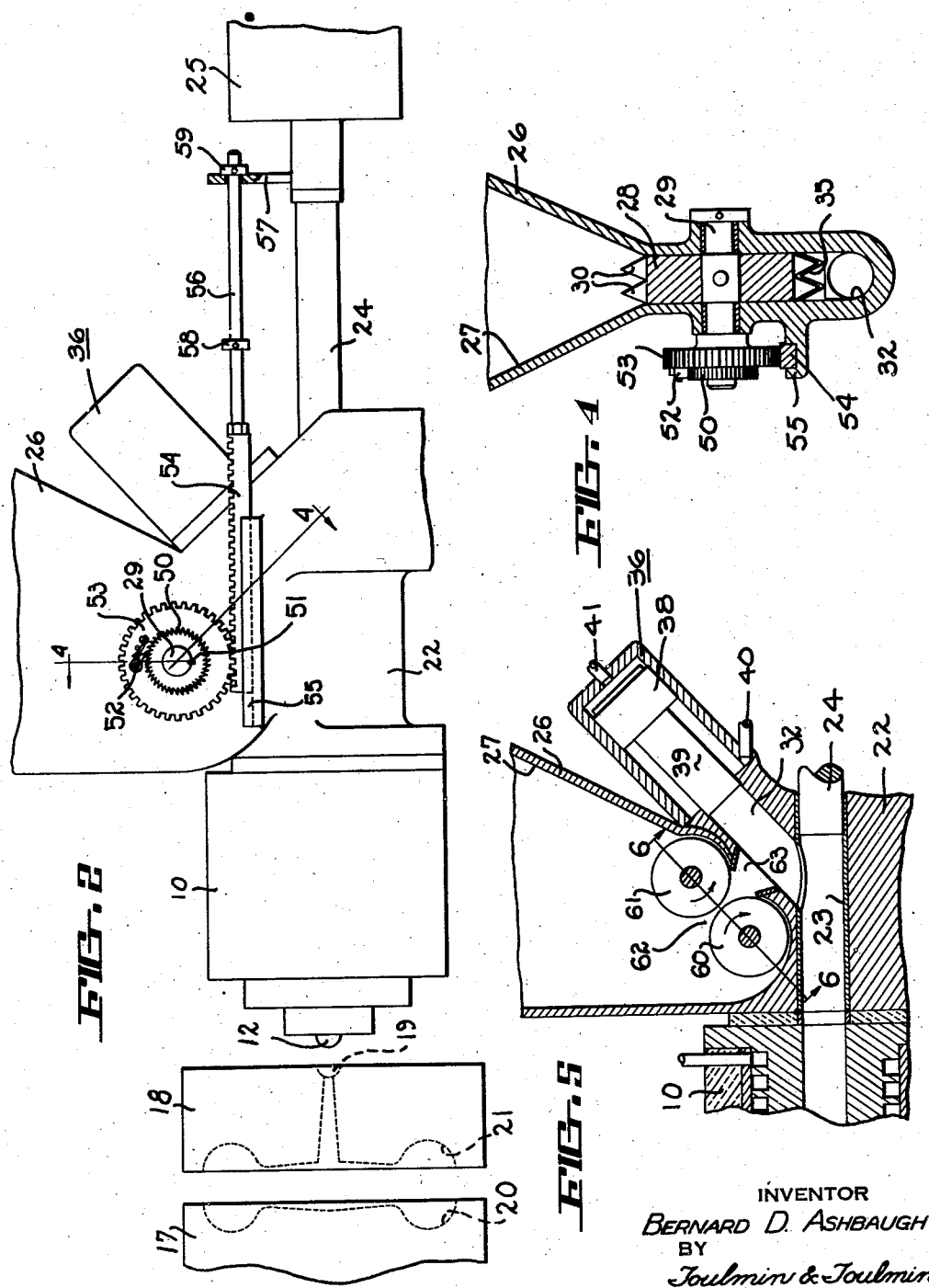
INVENTOR
BERNARD D. ASHBAUGH
BY
Toulmin & Toulmin
ATTORNEYS Patented Sept. 24, 1946

2,408,285

UNITED STATES PATENT OFFICE 2,408,285

FEEDING DEVICE FOR INJECTION OR EXTRUSION MACHINES

Bernard D. Ashbaugh, Mount Gilead, Ohio, assignor to The Hydraulic Development Corp., Inc., Wilmington, Del., a corporation of Delaware Application July 15, 1943, Serial No. 494,765

5 Claims. (Cl. 18—30)

This invention relates to injection machines, and particularly to injection machines that are adapted to work flock material.

An object of the invention is to provide an injection apparatus having a feeding mechanism that is adapted to feed substantially predetermined quantities of flock material into an injection cylinder, and to automatically compensate for variations in the quantity of material that is fed by the feeding apparatus into the injection cylinder.

Another object of the invention is to provide an injection apparatus that is provided with a positive feeding mechanism for moving flock material from a hopper into an injection cylinder whereby the variation in the quantity of material fed at the end of each injection stroke is maintained at a minimum.

Still another object of the invention is to provide an apparatus for feeding flock material that is actuated in response to the forward movement of the injection plunger of the injection machine so that approximately the same quantity of material is fed into the injection cylinder upon a retraction stroke of the same that was ejected from the injection cylinder during the forward stroke thereof.

Another object of the invention is to provide a mechanism for feeding flock material in accordance with the foregoing object wherein the apparatus is mechanically actuated, or alternately the apparatus may be electrically operated.

Still another object of the invention is to provide an injection machine having a feeding apparatus that is adapted to feed flock material into an auxiliary feeding chamber from which the material will be forced into the injection cylinder of the machine when the injection plunger has completed its retraction stroke, the flock material being fed from the auxiliary chamber by mechanical means.

Further objects and advantages will become apparent from the drawings and the following description.

In the drawings:

Figure 1 is a vertical cross sectional view of an injection machine incorporating the feeding mechanism of this invention, certain parts of the injection machine being shown in elevation.

Figure 2 is an elevational view of an injection machine similar to Figure 1 but illustrating the manner by which the feeding mechanism can be operated mechanically in place of electrically.

Figure 3 is a schematic electrical system for operating the feeding apparatus illustrated in Figure 1.

Figure 4 is a vertical cross sectional view of the feeding mechanism taken along line 4—4 of Figure 2 which illustrates the same feeding mechanism shown in Figure 1.

Figure 5 is a vertical cross sectional view of a portion of the injection machine shown in Figure 1 but illustrating a slightly modified arrangement of the feeding apparatus.

Figure 6 is a cross sectional view of the feeding apparatus illustrated in Figure 5 and is taken along line 6—6 of Figure 5.

Referring to Figure 1 the injection machine consists of an injection cylinder 10 having a cylinder bore 11 that receives plastic material, which in this instance is flock material. An injection nozzle 12 is provided on the end of the injection cylinder 10. Heat passages 13 are disposed around the injection cylinder 10 for receiving a suitable heating fluid through the supply conduit 14, a suitable return conduit 15 for the heating fluid being also provided. Heat insulating material 16 surrounds the injection cylinder 10 for retaining the heat therein.

A pair of molds 17 and 18 are adapted to cooperate with the injection cylinder 10, one of the molds 18 being preferably positioned stationarily with respect to the injection cylinder so that the nozzle 12 can withdraw from the socket 19 provided in the mold 18 and thereby break the heat connection from the cylinder to the mold during a part of the molding cycle. The mold member 17 is preferably movable toward and away from the mold 18 by means of a suitable hydraulic motor or other actuating mechanism in conventional manner.

The mold members 17 and 18 are provided with die cavities 20 and 21 that form a mold cavity when the mold members are brought into closed association.

The injection cylinder 10 is secured to a frame 22 that has a cylinder bore 23 therein disposed coaxial with the injection cylinder bore 11. An injection plunger 24 reciprocates within the cylinder bores 23 and 11 as actuated by a double-acting hydraulic motor 25 in conventional manner. A material feed hopper 26 is constructed as a part of the frame 22 and is positioned above the cylinder bore 23, the hopper 26 having a chamber 27 to receive plastic material, which in this instance is flock material.

Flock material is that plastic material that has small pieces of fabric, probably one-half inch square, intermixed with the granules or powder and is fed to the injection cylinder with the granular material, the fabric providing mechanical strength to the plastic material when it is molded into a desired form.

A feeding wheel 28 is disposed within the lower portion of the chamber 27 upon the drive shaft 29 that is suitably bearinged in the side walls of the chamber 27. The feeding wheel 28 carries a plurality of feeding blades 30 that extend radially from the periphery of the wheel 28. These feeding blades 30 are preferably V-shaped, as illustrated in Figure 4, so that they will engage the pieces of fabric in the flock material and feed them with the granular material.

A feed opening 31 is provided adjacent the bottom of the feed chamber 27 and communicates with an auxiliary feed chamber 32 that is connected to the cylinder bore 23 by means of a feed opening 33. A scraper blade 34 is positioned in the feed opening 31 from the hopper chamber 27 having a toothed edge 35 shaped to correspond with the V-shaped blades 30 that pass therethrough to thereby prevent flock material from being pulled around the periphery of the surface of the feed wheel 28 and for forcing the flock material through the feed opening 31.

A fluid motor 36 consisting of a cylinder 37 and a piston 38 having a plunger 39 thereon is secured to the frame 22 adjacent the auxiliary feed chamber 32 whereby the plunger 39 can reciprocate in the feed chamber 32 upon operation of the fluid motor 36. The fluid motor 36 is of the double-acting type having fluid supply connections 40 and 41.

The drive shaft 29 for the feed wheel 28 is connected to an electric motor 42 for driving the same.

Limit switches $LS_1$, $LS_2$ and $LS_3$ are carried upon a suitable bracket 43 that is secured to the frame 22. The plunger 24 of the fluid motor 25 is provided with a collar 44 that engages the limit switches during the reciprocable movement of the plunger 24. The limit switch $LS_3$ is provided with a pivoted lever arm 45 that engages a stop pin 46 to prevent rotation of the arm 45 in a leftward direction, but which arm 45 may pivot in a rightward direction, or clockwise, when it is struck by the collar 44 upon return of the plunger 24 to the retracted position.

The operation of the apparatus as illustrated in Figure 1 is such that when the injection plunger 24 is in the retracted position, as illustrated in Figure 1, the collar 44 engages the limit switch LS to thereby cause operation of the feed motor 42 for a predetermined period of time to feed a predetermined quantity of material, and thus rotate the feed wheel 28 for moving a quantity of flock material from the hopper chamber 27 into the auxiliary feed chamber 32. The feed wheel 28 will advance a substantially predetermined quantity of flock material into the auxiliary chamber 32 because it will rotate for a predetermined time interval. After the feed wheel 28 stops, the fluid motor 36 will have pressure applied thereto through the conduit 41 to advance the piston 38 and the plunger 39, whereby the plunger 39 moves the flock material in the auxiliary chamber 32 into the injection chamber 23. The fluid motor 25 will then be operated to advance the injection plunger 24 into the cylinder bore 23 and thereby force the flock material into the injection chamber 11 and through the nozzle 12 into the molds 17 and 18, it being understood that the nozzle 12 will at this time be in engagement with the nozzle socket 19 in the mold 18.

If the injection plunger 24 moves forward only sufficient to engage the limit switch $LS_3$, the feed motor 42 will be operated for the same predetermined time interval as occurred during the previous stroke when the limit switch $LS_2$ is engaged by the collar 44 upon complete retraction of the plunger 24. It will be understood that the plunger 39 has been retracted by the fluid motor 36 upon pressure being applied thereto through the conduit 40 sometime during the advancing stroke of the injection plunger 24 or during the early part of the retraction stroke thereof so that the machine will now be in readiness for another feeding cycle.

However, it is not possible to feed an exact quantity of flock material into the auxiliary chamber 32 upon each feeding cycle because the density of the material in the hopper chamber 27 varies considerably and thus affects variance in the quantity of material that is fed into the auxiliary chamber 32. Therefore, the feeding wheel 28 is arranged so that it will feed just slightly less than the full quantity required to fill the mold cavities 20 and 21. Thus, upon each injection stroke of the plunger 24 it will move forward a little further than on the previous stroke until such time that the collar 44 will ultimately strike the limit switch $LS_1$ when the plunger 24 is in the forwardmost position of its injection stroke. When this occurs an electrical system is actuated for increasing the next period of time for operating the feeding wheel 28 during the succeeding feeding period so that a greater quantity of material will be fed into the auxiliary chamber for this particular cycle of operation of the machine.

Thus, the quantity of material that is fed to the auxiliary chamber 32 will cause the plunger 24 to stroke short of the limit switch $LS_1$ on the next cycle of operation so that the feed motor 42 will again be operated on what may be termed on a normal feeding operation.

The electrical system for accomplishing the foregoing operation of the injection machine is shown in Figure 3 wherein the limit switch $LS_1$ is connected across the power lines 47 and 48 in series with a pair of normally closed contact blades $B_3$ that is also in series with a relay coil A. A pair of normally open contact blades $A_1$ by-passes the limit switch $LS_1$ in a manner hereinafter described and is actuated by the relay coil A.

The limit switch $LS_2$ is connected across the power lines 47 and 48 through a pair of normally closed contact blades $B_2$ that is actuated by a relay coil B. This limit switch $LS_2$ is connected in series with a pair of normally open contact blades $A_2$ and a timer T, the timer T controlling the period of operation of the feed motor 42. A second timer TT is placed in series with the limit switch $LS_2$ through a pair of normally closed contact blades $A_3$, this timer TT being adapted to operate the feed motor 42 for a shorter period of time than the timer T whereby a smaller quantity of material will be fed by the feeding wheel 28 when the timer T closes circuit to the motor 42. The feed motor 42 is also in series with the limit switch $LS_2$.

The limit switch $LS_3$ is in series with a pair of normally open contact blades $T_1$ that is actuated by the timer T that is also in series with the relay coil B. A second normally open pair of contact blades $TT_1$ is in series with the limit switch $LS_3$ as well as a normally open pair of contact blades $B_1$.

The operation of the electrical system is such that considering the system as normal before actuation of any element as illustrated in Figure 3, all the elements being in their normal position, limit switch LS2 will be closed when the plunger 24 is completely retracted so that timer TT will be energized as well as the feed motor 42 thereby operating the feed motor for a predetermined period and thus feed a predetermined quantity of flock material into the auxiliary chamber 32. When the timer TT has run its period, the contacts TT1 are closed thereby energizing relay B to close contacts B1 and open contacts B2 and B3 thereby de-energizing the timer circuit TT. The plunger 24 will now be on a forward stroke and limit switch LS2 will open as soon as the collar 44 leaves the same. If the collar 44 only strikes the limit switch LS3 it will open the same to thereby de-energize the relay coil B to open contacts B1 and close contacts B2 and B3, thereby conditioning the timer circuits T and TT so that when limit switch LS2 is again closed the timer TT will again function.

However, if in the forward stroke of the plunger 24 the collar 44 has passed over the timer LS3 to open the same and thus close contacts B2 and B3 and then strikes limit switch LS1, the relay coil A will be energized thereby closing contacts A1 and A2 and opening contacts A3, contacts A1 providing a holding circuit for the relay A. When the circuit is in this condition closure of limit switch LS2 will now cause energization of timer T and thereby operate the feed motor 42 for a greater period of time than occurs when the timer TT is in control of the motor operation.

When the collar 44 again moves forward and strikes limit switch LS3 the relay coil A will be de-energized due to opening of the contacts B3 and thereby throw the feed motor on to the normal cycle timer TT.

It will be noted that the limit switch LS3 is actuated on the forward stroke of the plunger 24 but that the collar 44 can ride over the limit switch LS3 on a rearward stroke, the arm 45 pivoting about the pin 49 for this purpose.

In Figure 2 there is shown a mechanical feeding device for actuating the feeding wheel 28 that has previously been described with regard to Figure 1. In the arrangement shown in Figure 2 the injection machine is identical to the machine heretofore described and therefore the same reference numerals will be applied to this figure where the parts are identical.

The drive shaft 29 that carries the feeding wheel 28 also carries a ratchet wheel 50 that is secured thereto as by means of the key 51. A pawl 52 is carried upon the gear 53 that is freely rotatably mounted upon the drive shaft 29 so that the gear will drive the ratchet 50 in one direction of movement only.

The gear 53 is engaged by a rack 54 carried within the guide support 55. A tail rod 56 extends from the rack 54 through an arm 57 secured to the plunger 24. A pair of collars 58 and 59 are adjustably secured upon the tail rod 56 and are engaged by the arm 57 during reciprocable movement of the plunger 24.

Upon forward movement of the injection plunger 24 the collar 58 is engaged by the arm 57 to advance the rack 54 and rotate the gear 53. At this time, however, the pawl 52 rides over the ratchet 50 and there is no feeding operation of the feed wheel 28. Upon retraction movement of the plunger 24 the collar 59 is engaged by the arm 57 to move the rack 54 in a rightward direction and thus rotate the gear 53 in a counterclockwise direction. At this time the pawl 52 will engage the ratchet 50 to drive the shaft 29 and thus rotate the wheel 28 for feeding a quantity of material into the auxiliary feed chamber heretofore described. By properly positioning the collar 58 in accordance with the beginning of the injection stroke of the machine it will be apparent that it is possible to adjust the stroke of the rack 54 so as to proportion the quantity of material that is fed by feeding wheel 28 during the retraction stroke of the plunger 24 to that which has been ejected from the injection plunger, the stroke of the injection plunger 24 providing the means for engaging the quantity of material that is ejected.

In Figures 5 and 6 there is illustrated a modified arrangement of the feeding apparatus that has been applied to the same machine heretofore described with regard to Figure 1 so that the elements of the apparatus that are the same will be referred to as like numerals.

In this arrangement the feed hopper 26 is provided with a pair of feeding wheels 60 and 61. These feeding wheels are suitably geared together by means of the gears 64 and 65 so that they rotate in opposite directions as indicated by the arrows thereon to thereby collect flock material in a space 62 above the wheels 60 and 61 and feed the same into the feed opening 63 beneath the feed wheels 60 and 61 from which it will be moved into the auxiliary chamber 32.

The feed wheels 60 and 61 may be either driven by the electric motor, illustrated in Figure 1, under control of the electric circuit illustrated in Figure 3, or by means of the mechanical apparatus illustrated in Figure 2. In either instance, however, the operation of the machine will be the same as heretofore described.

While the apparatus herein disclosed and described constitutes a preferred form of the invention, yet it will be understood that the apparatus is capable of mechanical alteration without departing from the spirit of the invention and that such modifications as fall within the scope of the appended claims are intended to be included herein. It is to be further understood that while in the description of this invention that the use of flock material has been referred to as being the material fed by the feeding apparatus, that other plastic materials are just as capable of being fed by the apparatus disclosed as the specifically referred to flock material, and that such other materials are considered as being in the scope of this invention.

Having thus fully described my invention what I claim as new and desire to secure by Letters Patent is:

1. In an injection molding device for feeding flock material, a feed hopper for receiving flock material, said hopper having a rounded base portion and an opening adjacent said base portion, an auxiliary feed means including a chamber positioned tangentially to said rounded base portion and communicating with said hopper through said opening, feed wheel means positioned in the bottom of said hopper and having vane means extending closely adjacent to said rounded base portion and adjacent the opening, means for rotating said feed wheel means, a scraper adjacent said opening positioned to remove material from said feed wheel and deposit the same in said opening, piston means reciprocating in said auxiliary feed chamber, means for operating said piston, said chamber having an exit opening communicating with the injection molding device, said piston being reciprocable in said chamber on a line substantially tangent to said rounded base portion.

2. In an injection molding device for feeding flock material, a feed hopper for receiving flock material, said hopper having a rounded base portion and an opening adjacent one end of said rounded base portion, an auxiliary feed means including a chamber positioned tangentially to said rounded base portion and communicating with said hopper through said opening, feed wheel means positioned in the bottom of said hopper and having vane means extending closely adjacent to said rounded base portion and adjacent the opening, means for rotating said feed wheel means, a scraper adjacent said opening positioned to remove material from said feed wheel and deposit the same in said opening, piston means reciprocating in said auxiliary feed chamber, means for operating said piston, said chamber having an exit opening communicating with the injection molding device, said piston being reciprocable in said chamber on a line substantially tangent to said rounded base portion, said scraper blade extending into said opening means.

3. In an injection molding device for feeding flock material, a feed hopper for receiving flock material, said hopper having a rounded base portion with an opening adjacent one end of said rounded base portion, an auxiliary feed means including a chamber positioned tangentially to said rounded base portion and communicating with said hopper through said opening, feed wheel means positioned in the bottom of said hopper and having vane means extending closely adjacent to said rounded base portion and adjacent the opening means for rotating said feed wheel means, piston means reciprocating in said auxiliary feed chamber, means for operating said piston, said chamber having an exit opening communicating with the injection molding device, said piston being reciprocable in said chamber on a line substantially tangent to said rounded base portion, and a scraper blade extending into said opening means, said scraper blade having a plurality of openings and said feed wheel means having a plurality of sets of parallel teeth adapted to pass through said openings when said feed wheel means is rotated whereby said scraper blade removes material from said openings.

4. In an injection molding device for feeding flock material, a feed hopper for receiving flock material, said hopper having a rounded base portion with an opening adjacent one end of said rounded base portion, an auxiliary feed means including a chamber positioned tangentially to said rounded base portion and communicating with said hopper through said opening, feed wheel means positioned in the bottom of said hopper and having vane means extending closely adjacent to said rounded base portion and adjacent the opening means for rotating said feed wheel means, piston means reciprocating in said auxiliary feed chamber, means for operating said piston, said chamber having an exit opening communicating with the injection molding device, said piston being reciprocable in said chamber on a line substantially tangent to said rounded base portion, and a scraper blade extending into said opening means, said scraper blade having a plurality of openings and said feed wheel means having a plurality of teeth adapted to pass through said openings when said feed wheel means is rotated whereby said scraper blade removes material from said openings.

5. In an injection device for feeding flock material, a feed hopper for receiving flock material, said hopper having a rounded base portion and side walls, said rounded base portion forming the bottom of said hopper, said hopper having an opening at the point where said rounded base portion joins said side walls, an auxiliary feed means including a chamber positioned tangentially to said rounded base portion and communicating with said hopper through said opening, feed wheel means positioned in said hopper and having vane means extending closely adjacent to a portion of said side walls, into said opening and adjacent to said rounded base portion, means for rotating said feed wheel means, means operating said auxiliary feed means, said chamber having an exit opening communicating with the injection device, and a scraper blade positioned to extend partially across said first named opening and to intercept the path of rotation of said vane means whereby flock material moved by said vane means will be removed from the same and fall by gravity through said first named chamber, said vane means operating to remove from said rounded base portion of said hopper the material supported thereby.

BERNARD D. ASHBAUGH.